US010113076B2

(12) United States Patent
Moorlag et al.

(10) Patent No.: US 10,113,076 B2
(45) **Date of Patent: *Oct. 30, 2018**

(54) INVERSE EMULSION ACRYLATE INK COMPOSITIONS FOR INK-BASED DIGITAL LITHOGRAPHIC PRINTING

(71) Applicant: XEROX Corporation, Norwalk, CT (US)

(72) Inventors: Carolyn Moorlag, Mississauga (CA); Marcel Breton, Mississauga (CA); C. Geoffrey Allen, Waterdown (CA); Jenny Eliyahu, Maple (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,071

(22) Filed: Sep. 30, 2014

(65) Prior Publication Data

US 2016/0090490 A1 Mar. 31, 2016

(51) Int. Cl.

*C09D 11/106* (2014.01)
*C09D 11/107* (2014.01)
*C09D 11/023* (2014.01)
*C09D 11/104* (2014.01)
*B41M 5/395* (2006.01)

(52) U.S. Cl.

CPC ........... *C09D 11/107* (2013.01); *B41M 5/395* (2013.01); *C09D 11/023* (2013.01); *C09D 11/104* (2013.01)

(58) Field of Classification Search

CPC .... B41M 5/395; C09D 11/101; C09D 11/105; C09D 11/107; C09D 11/104; C09D 11/023

See application file for complete search history.

(56) References Cited

U.S. PATENT DOCUMENTS 3,945,957 A 3/1976 Noshiro et al.
4,304,601 A 12/1981 Sharp
4,403,550 A 9/1983 Sharp
4,445,432 A 5/1984 Ford, Jr. et al.
4,806,391 A 2/1989 Shorin
4,911,999 A 3/1990 Legere
4,927,180 A 5/1990 Trundle et al.
5,085,698 A 2/1992 Ma et al.
5,502,476 A 3/1996 Neal et al.
5,834,118 A 11/1998 Ranby et al.
5,886,067 A 3/1999 Li et al.
6,114,489 A 9/2000 Vicari et al.
6,140,392 A * 10/2000 Kingman ............ C09D 11/106 523/160
6,239,189 B1 * 5/2001 Narayan ................ C07C 69/54 522/101
6,329,446 B1 12/2001 Sacripante et al.
6,348,561 B1 2/2002 Mychajlowskij et al.
6,664,015 B1 12/2003 Sacripante
6,896,937 B2 5/2005 Woudenberg
7,022,752 B2 4/2006 Hayashi et al.
7,151,153 B2 12/2006 Bruchmann et al.
7,202,006 B2 4/2007 Chopra et al.
7,208,258 B2 4/2007 Gervasi et al.
7,322,688 B2 1/2008 Woudenberg
7,538,070 B2 5/2009 Iftime et al.
7,556,844 B2 7/2009 Iftime et al.
7,674,326 B2 3/2010 Iftime et al.
7,708,396 B2 5/2010 Iftime et al.
7,718,325 B2 5/2010 Norsten et al.
7,723,398 B2 5/2010 Ilg et al.
7,909,924 B2 3/2011 Krishnan et al.
7,964,271 B2 6/2011 Norsten et al.
8,001,889 B2 8/2011 Gaugenrieder et al.
8,124,791 B2 2/2012 Shinjo et al.
8,158,693 B2 4/2012 Breton et al.
8,222,313 B2 7/2012 Iftime et al.
8,771,787 B2 7/2014 Breton et al.
8,895,400 B2 11/2014 Seo et al.
9,011,594 B1 4/2015 Kanungo et al.

(Continued)

FOREIGN PATENT DOCUMENTS

EP 1235863 B1 1/2005
JP 03069954 A 3/1991

(Continued)

OTHER PUBLICATIONS

Communication dated May 4, 2015, issued in EP Appl. No. 14196839.6, pp. 1-5.

Leach, et al., “The Printing Ink Manual, 5th Edition”, Blue Print, New York, pp. 84-86, 516, 525, 544-550, 724-726 (1993).

Henri Bouas-Laurent, et al., Organic Photochromism (IUPAC Technical Report), Pure Appl. Chem., vol. 73, No. 4, pp. 639-665, 2001.

Breton, et al., “White Ink Composition for Ink-Based Digital Printing”, U.S. Appl. No. 14/028,369, filed Sep. 16, 2013.

Breton, et al., “Water-Dilutable Inks and Water-Diluted Radiation Curable Inks Useful for Ink-Based Digital Printing”, U.S. Appl. No. 13/897,300, filed May 17, 2013.

Allen, et al., “Acrylate Ink Compositions for Ink-Based Digital Lithographic Printing”, U.S. Appl. No. 14/645,153, filed Mar. 11, 2015.

(Continued)

*Primary Examiner* — Robert J Grun
*Assistant Examiner* — Michael Robinson
(74) *Attorney, Agent, or Firm* — MH2 Technology Law Group LLP

(57) ABSTRACT

The disclosed embodiments are directed to a composition of an inverse emulsion acrylate ink for use in variable data digital lithographic image forming devices and methods for preparing and using the ink. The disclosed inverse emulsion acrylate ink includes an acrylate monomer, oligomer, polymer, or mixtures thereof that is a continuous phase, and water dispersed as an emulsion in the continuous acrylate phase. The disclosed inverse emulsion acrylate ink includes one or more of a color pigment component, a rheology modifying agent, a stabilizing agent, and a photoinitiator component. The water may be supplemented with a surfactant to lower a surface tension of the water.

16 Claims, 1 Drawing Sheet

(56) References Cited

U.S. PATENT DOCUMENTS 9,193,209 B2 11/2015 Dooley et al.
9,283,795 B1 3/2016 Kanungo et al.
9,359,512 B2 6/2016 Moorlag et al.
9,387,661 B2 7/2016 Zirilli
9,422,436 B2 8/2016 Birau et al.
2002/0040073 A1* 4/2002 Stone .................... C08F 289/00 522/31
2002/0107303 A1 8/2002 Miyabashi et al.
2003/0003323 A1 1/2003 Murakami
2003/0021961 A1 1/2003 Ylitalo et al.
2003/0044691 A1 3/2003 Setthachayanon et al.
2003/0149130 A1 8/2003 Kondo
2004/0009363 A1* 1/2004 Shouldice ............. B41C 1/1016 428/523
2004/0063809 A1 4/2004 Fu et al.
2004/0132862 A1 7/2004 Woudenberg
2004/0233465 A1 11/2004 Coyle
2005/0166783 A1 8/2005 Ylitalo et al.
2006/0054040 A1 3/2006 Daems et al.
2007/0073762 A1 3/2007 Adamson et al.
2007/0166479 A1 7/2007 Drake et al.
2007/0257976 A1 11/2007 Takabayashi
2007/0259986 A1 11/2007 Elwakil et al.
2008/0090929 A1 4/2008 Wilson et al.
2008/0139743 A1* 6/2008 Krishnan ............... C09D 11/03 524/612
2008/0241485 A1 10/2008 Shimohara et al.
2008/0258345 A1 10/2008 Bens et al.
2008/0317957 A1 12/2008 Overbeek et al.
2009/0038506 A1 2/2009 Odell et al.
2009/0104373 A1 4/2009 Vanbesien et al.
2009/0110843 A1 4/2009 Halahmi et al.
2009/0135239 A1 5/2009 Chretien et al.
2009/0280302 A1 11/2009 Fukumoto et al.
2010/0016513 A1 1/2010 Hartmann et al.
2010/0020123 A1 1/2010 Hirato
2010/0067056 A1 3/2010 Rich et al.
2010/0214373 A1 8/2010 Carr et al.
2010/0239777 A1 9/2010 Nakajimi et al.
2010/0304040 A1 12/2010 Chretien et al.
2011/0045199 A1 2/2011 Cong
2011/0141187 A1 6/2011 Takabayashi
2011/0152397 A1* 6/2011 Breton ................. C09D 11/101 522/42
2011/0188023 A1 8/2011 Rondon et al.
2011/0196058 A1 8/2011 Breton et al.
2011/0243629 A1* 10/2011 Roberts ...................... B41J 3/32 400/109.1
2011/0262711 A1 10/2011 Chopra et al.
2012/0040156 A1 2/2012 Ohashi et al.
2012/0103212 A1 5/2012 Stowe et al.
2012/0103213 A1 5/2012 Stowe
2012/0103218 A1 5/2012 Stowe et al.
2012/0103221 A1 5/2012 Stowe et al.
2012/0157561 A1* 6/2012 Gould .................... B41J 11/002 522/16
2012/0309896 A1 12/2012 Carlini et al.
2013/0050366 A1 2/2013 Sasada et al.
2013/0085208 A1 4/2013 Norikoshi et al.
2013/0104756 A1 5/2013 Stowe et al.
2013/0305946 A1 11/2013 Iftime et al.
2013/0305947 A1 11/2013 Iftime et al.
2013/0307913 A1 11/2013 Kawashima et al.
2013/0310479 A1 11/2013 Lee et al.
2013/0310517 A1 11/2013 Lee et al.
2013/0324653 A1 12/2013 Bollard et al.
2014/0235752 A1 8/2014 Gharapetian et al.
2014/0333704 A1 11/2014 Takabayashi et al.
2014/0340455 A1 11/2014 Breton et al.
2015/0077501 A1 3/2015 Breton et al.
2015/0093690 A1 4/2015 Shimura et al.
2015/0116416 A1 4/2015 Belelie et al.
2015/0170498 A1 6/2015 Beggs et al.
2015/0174887 A1 6/2015 Moorlag et al.
2015/0175820 A1 6/2015 Breton et al.
2015/0175821 A1 6/2015 Moorlag et al.
2016/0090490 A1 3/2016 Moorlag et al.
2016/0176185 A1 6/2016 Kanungo et al.
2016/0177113 A1 6/2016 Allen et al.
2016/0222231 A1 8/2016 Allen et al.
2016/0237290 A1 8/2016 Moorlag et al.
2016/0257829 A1 9/2016 Breton et al.
2016/0264798 A1 9/2016 Allen et al.

FOREIGN PATENT DOCUMENTS

JP 2011208019 A 10/2011
WO 2013119539 A1 8/2013

OTHER PUBLICATIONS

Lee, et al., "Methods for Manufacturing Curable Inks for Digital Offset Printing Applications and the Inks Made Therefrom", U.S. Appl. No. 13/947,959, filed Jul. 22, 2013.

Iftime et al., "Fluorescent Security Enabled Ink for Digital Offset Printing Applications", U.S. Appl. No. 13/473,791, filed May 17, 2012.

Iftime, et al., "Photochromic Security Enabled Ink for Digital Offset Printing Applications", U.S. Appl. No. 13/473,921, filed May 17, 2012.

Moorlag, et al., "Methods for Ink-Based Digital Printing With High Ink Transfer Efficiency", U.S. Appl. No. 14/139,690, filed Dec. 23, 2013.

Breton, et al., "Aqueous Dispersible Polymer Inks", U.S. Appl. No. 14/139,708, filed Dec. 23, 2013.

Birau et al., "White Ink Composition for Ink-Based Digital Printing", U.S. Appl. No. 14/619,820, filed Feb. 11, 2015.

Lee, et al., "Methods for Manufacturing Curable Inks for Digital Offset Printing Applications and the Inks Made Therefrom", U.S. Appl. No. 13/474,185, filed May 17, 2012.

Allen, et al., "Acrylate Ink Compositions for Ink-Based Digital Lithographic Printing", U.S. Appl. No. 14/610,437, filed Jan. 30, 2015.

Breton, et al., "Process Black Ink Compositions and Uses Thereof", U.S. Appl. No. 14/635,679, filed Mar. 2, 2015.

Moorlag, et al., "Hyperbranched Ink Compositions for Controlled Dimensional Change and Low Energy Curing", U.S. Appl. No. 14/620,945, filed Feb. 12, 2015.

Allen, et al., "Acrylate Ink Compositions for Ink-Based Digital Lithographic Printing", U.S. Appl. No. 14/573,913, filed Dec. 17, 2014.

Thesis of Enrique Michel-Sanchez, Impact of Particle Morphology on the Rheology of PCC-Based Coatings, Aug. 2005.

Badesha, et al. "Fluorosilicone composite and Formulation Process for Imaging Plate", U.S. Appl. No. 15/222,364, filed Jul. 28, 2016.

Stowe, et al., "Methods for Rejuvenating an Imaging Member of an Ink-Based Digital Printing System", U.S. Appl. No. 15/240,691, filed Aug. 18, 2016.

Birau, et al. "Ink Composition and Method of Printing", U.S. Appl. No. 15/377,881, filed Dec. 13, 2016.

* cited by examiner

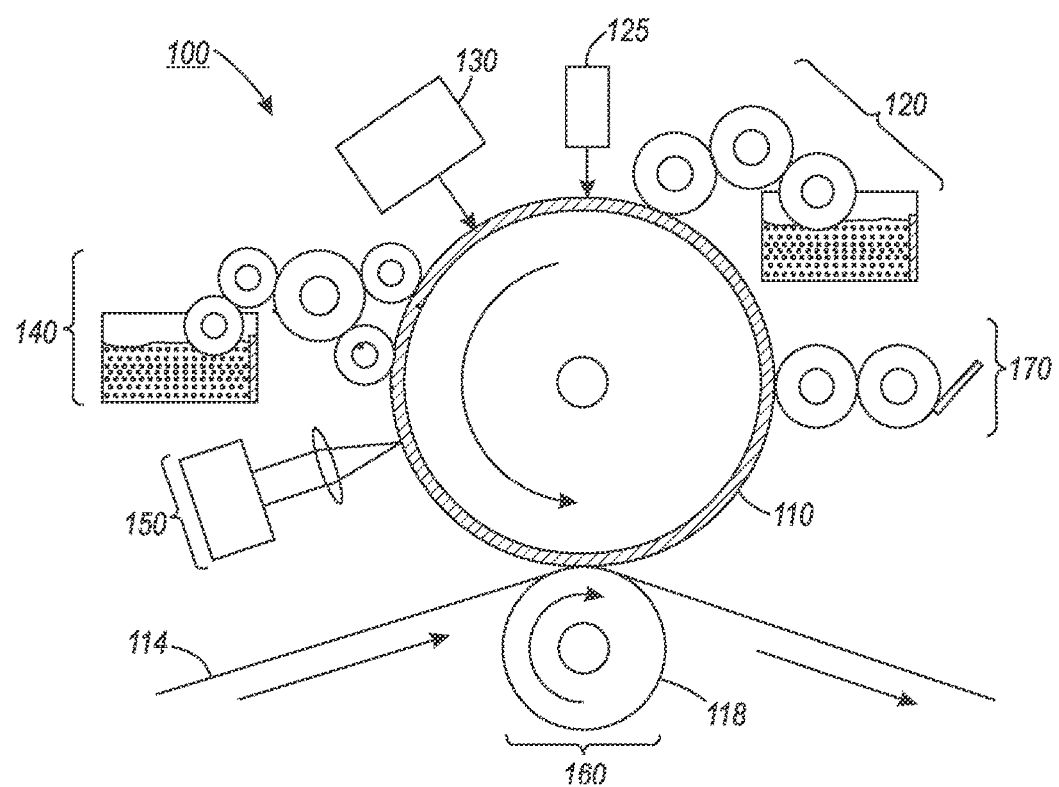
RELATED ART

INVERSE EMULSION ACRYLATE INK COMPOSITIONS FOR INK-BASED DIGITAL LITHOGRAPHIC PRINTING

FIELD OF DISCLOSURE

The disclosure relates to inks for printing images on substrates such as paper, plastic, metal, or other printable materials. In particular, the disclosure relates to inverse emulsion acrylate inks that are useful for printing with ink-based digital lithographic printing systems.

BACKGROUND

Digital offset lithography printing systems require offset-type inks that are specifically designed and optimized to be compatible with various subsystems, including ink delivery systems and a laser imaging systems, to enable high quality digital printing at high speed. Related art offset-type inks suffer shortfalls including, but not limited to, (1) being difficult to deliver via preferred inking systems, including anilox roller-type inking systems, (2) being soluble in commonly-employed dampening fluids, such as octamethylcyclotetrasiloxane (D4), (3) causing image background and/or ghosting issues, (4) being costly to manufacture and use, and (5) exhibiting inefficient image transfer. These shortfalls, individually and in combination, tend to narrow a design space within which related art inks are usable in the context of digital offset lithography printing systems.

SUMMARY

There is a need to develop inks that exhibit improved qualities and that may address one or all of the above-identified shortfalls. Extensive experimentation reveals that an emulsified, water-containing ink composition may provide enhanced ease of delivery to an imaging member such as a reimageable offset plate, enhanced transfer efficiency from the reimageable offset plate, and enhanced print quality on a variety of substrates. In addition, there is a need for a printing technology that achieves excellent printing performance on a variety of substrates at a low ink manufacturing cost.

Aqueous inks are advantageous at least because they are cost-effective. Further, these inks do not tend to degrade printing system components such as reimageable surfaces of imaging members with which they contact. Aqueous inks suitable for ink-based digital printing should meet various sub-system requirements imposed by ink-based digital printing systems that are configured for variable data lithographic printing. These requirements include wettability, releasability from a reimageable surface of an imaging member, and compatibility with non-aqueous dampening fluids configured for use with ink-based digital printing methods and systems.

Inks for variable data offset printing are provided that meet the foregoing requirements. The disclosed inks may be effectively delivered from an anilox roller-type delivery system to a reimageable surface of the imaging member during a variable data offset printing operation in which images on the reimageable surface are changeable between cycles of the imaging member. Inks in accordance with disclosed embodiments are curable emulsion inks that are formed from non-polar acrylate inks and water. The disclosed inks exhibit stable rheology that enables delivery using an anilox roll delivery system, and demonstrate desirable transferability to a reimageable surface of an imaging member with the optional evaporation of water.

Exemplary embodiments are described in detail below in formulation and in use. It is envisioned, however, that any system that incorporates features of the systems and compositions, as set forth below may be encompassed by the scope and spirit of the exemplary embodiments.

BRIEF DESCRIPTION OF THE DRAWINGS

FIG. 1 illustrates a schematic representation of a related art ink-based variable image digital printing system with which inverse emulsion acrylate ink compositions according to this disclosure may be used.

DETAILED DESCRIPTION

Exemplary embodiments are intended to cover alternatives, modifications, and equivalents as may be included within the spirit and scope of the compositions and systems described in detail below.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Reference is made to the drawings to accommodate understanding of inks compositions, methods, and systems of embodiments, particularly inverse emulsion acrylate ink compositions. An emulsion is a mixture of two or more liquids that may be immiscible. An emulsion is part of a more general class of two-phase systems of matter known as colloids. Those of skill in the art recognize that the term "inverse emulsion" may be characterized as referring to a class of emulsions in which, for example, water is dispersed in a continuous phase of oil. In an emulsion, a first liquid, the dispersed phase, is dispersed in a second liquid, the continuous phase. In an inverse emulsion, for example, water may be the dispersed phase with oil being the continuous phase. An inverse emulsion is also characterized by stability of the dispersion of the two phases over an extended period of time, or over the required time period for use of the materials. A stable phase may be characterized by no detectable separation and stable rheological measurement.

Aqueous inks in accordance with embodiments are suitable for ink-based digital printing. "Variable data lithography printing," or "ink-based digital printing," or "digital offset printing," as these terms may be used throughout this disclosure, refer to lithographic printing of variable image data for producing images on a substrate that are changeable with each subsequent rendering of an image on the substrate in an image forming process. "Variable data lithographic printing" includes offset printing of ink images using lithographic ink where the images are based on digital image data that may vary from image to image. Ink-based digital printing uses a variable data lithography printing system, or digital offset printing system. A "variable data lithography system" is a system that is configured for lithographic printing using lithographic inks and based on digital image data, which may be variable from one image to the next.

By way of example, an ink-based digital printing system with anilox roll ink delivery subsystem that may be used for printing with inverse emulsion acrylate inks of embodiments is described. U.S. patent application Ser. No. 13/095,714 ("714 Application"), titled "Variable Data Lithography System," filed on Apr. 27, 2011 by Timothy Stowe et al., which is commonly assigned, and the disclosure of which is hereby incorporated by reference herein in its entirety, describes an exemplary variable data lithography system 100 for ink-based digital printing in FIG. 1. A general description of the exemplary printing system 100 shown in FIG. 1 is provided below. Additional details regarding individual components and/or subsystems shown in the exemplary system 100 of FIG. 1 may be found in the 714 Application.

As shown in FIG. 1, the exemplary printing system 100 may include an imaging member 110. The imaging member 110 in the embodiment shown in FIG. 1 is a drum, but this exemplary depiction should not be interpreted so as to exclude embodiments wherein the imaging member 110 includes a drum, plate or a belt, or another now known or later developed configuration. The imaging member 110 includes a reimageable surface that may be formed of materials including, for example, a class of materials commonly referred to as silicones, including polydimethylsiloxane (PDMS), among others. For example, silicone, fluorosilicone, and/or fluoroelastomer may be used to form the reimageable surface of the imaging member 110. The reimageable surface may be formed of a relatively thin layer over a mounting layer, a thickness of the relatively thin layer being selected to balance printing or marking performance, durability and manufacturability.

The imaging member 110 is used to apply an inked image to an image receiving media substrate 114 at a transfer nip 112. The transfer nip 112 may be formed by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary printing system 100 may be used for producing images on a wide variety of image receiving media substrates 114. The 714 Application also explains the wide latitude of marking (printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers over a cylindrical core.

The exemplary printing system 100 may include a dampening fluid system 120 generally comprising a series of rollers, which may be considered as dampening rollers or collectively as a dampening unit, for uniformly wetting the reimageable surface of the imaging member 110 with dampening fluid. A purpose of the dampening fluid system 120 is to deliver a layer of dampening fluid, generally having a uniform and controlled thickness, to the reimageable surface of the imaging member 110. A dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Extensive experimentation has found that a preferred dampening fluid may be D4 (octamethylcyclotetrasiloxane). Other suitable dampening fluids are disclosed, by way of example, in co-pending U.S. patent application Ser. No. 13/284,114, filed on Oct. 28, 2011, titled "Dampening Fluid for Digital Lithographic Printing," the disclosure of which is hereby incorporated herein by reference in its entirety.

Once the dampening fluid is metered onto the reimageable surface of the imaging member 110 by the dampening fluid system 120, a thickness of the dampening fluid may be measured using a sensor 125 that may provide feedback to control the metering of the dampening fluid onto the reimageable surface of the imaging member 110 by the dampening fluid system 120.

After a precise and uniform amount of dampening fluid is provided by the dampening fluid system 120 on the reimageable surface of the imaging member 110, an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface of the imaging member 110. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a pre-cure or rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The use of an inverse emulsion ink may enable high transfer efficiency without the use of control subsystem 150, due to rheology and/or cohesion modification through the evaporation of included water.

The ink is then transferred from the reimageable surface of the imaging member 110 to a substrate of image receiving medium 114 using a transfer subsystem 160. The transfer occurs as the image receiving media substrate 114 is passed through a nip 112 between the imaging member 110 and an impression roller 118 such that the ink within the voids of the reimageable surface of the imaging member 110 is brought into physical contact with the image receiving media substrate 114. With the adhesion of the ink having been modified by the rheology control system 150, or the adhesion of the ink promoted based on an inverse emulsion composition of the ink, adhesion of the ink may cause the ink to adhere to the image receiving media substrate 114 and to separate from the reimageable surface of the imaging member 110. Careful control of the rheology of the ink through composition or other means, as well as temperature and pressure conditions at the transfer nip 112, may allow, or otherwise facilitate, transfer efficiencies for the ink from the reimageable surface of the imaging member 110 to the image receiving media substrate 114 to exceed 95%. While it is possible that some dampening fluid may also wet the image receiving media substrate 114, the volume of such a dampening fluid will be minimal, and will rapidly evaporate or be absorbed by the image receiving media substrate 114.

In certain offset lithographic systems, it should be recognized that an offset roller, not shown in FIG. 1, may first receive the inked image pattern and then transfer the inked image pattern to a substrate according to a known indirect transfer method.

Following the transfer of a high percentage of the ink to the image receiving media substrate 114, residual ink and/or residual dampening fluid should be removed from the reimageable surface of the imaging member 110, preferably without scraping or wearing the reimageable surface. An air knife may be employed to remove residual dampening fluid. It is anticipated, however, that some amount of ink residue may remain on the reimageable surface. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, cleaning of the residual ink and dampening fluid from the reimageable surface of the imaging member 110 is essential to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may preferably be formed of a polymeric elastomer, such as silicone rubber and/or fluorosilicone rubber. The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

As discussed above, inks that are useful for ink-based digital offset printing must possess physical and chemical properties that meet the specific demands of ink-based digital printing systems such as the system shown in FIG. 1. The digital offset ink must be compatible with materials with which it is intended to come in contact, including the imaging plate (reimageable surface of the imaging member) and various dampening fluids, as well as printable substrates such as paper, metal, or plastic. The digital offset ink must also meet all functional requirements of the subsystems as imposed by wetting and transfer properties defined by subsystem architecture and materials sets.

Inks formulated for ink-based digital printing, or digital offset inks, are different in many ways from other inks developed for printing applications, including pigmented solvent inks, offset inks, flexography inks, UV gel inks, and the like. For example, digital offset inks contain much higher pigment loading leading to higher viscosities at room temperature than other inks, which can make ink delivery by way of an anilox roller system difficult. Digital offset inks should not cause the imaging member (reimageable) surface, which may be a silicone, fluorosilicone, or VITON-containing imaging plate or blanket, to swell and should be compatible with dampening fluid options.

Acrylate based formulations are relatively non-polar in nature, but may be emulsified with water by incorporation of a surfactant additive. An inverse emulsification of acrylate ink has been found to minimize a solubility of the acrylate ink in dampening fluid such as D4, and to minimize or prevent swelling of a fluorosilicone-containing imaging member. Ink compositions in accordance with embodiments preferably exhibit a rheology that is suitable for anilox roller delivery by way of low content water-in-ink emulsification. An advantage of emulsification over mere dilution with water is that emulsification provides a greater energy barrier to evaporation, yielding a more stable ink composition.

Inverse emulsion acrylate inks in accordance with compositions of embodiments may be formed from non-polar acrylate ink formulations, water, and surfactant to yield stable rheology suitable for anilox roller-type ink delivery systems. Inverse emulsion inks in accordance with embodiments include digital offset acrylate inks that exhibit desirable transferability with evaporation of water. Importantly, emulsion inks in accordance with embodiments are compatible with non-aqueous dampening fluids and exhibit desirable releasability from the imaging member (reimageable) surface after ink image formation. Inks in accordance with embodiments may include a pigment, an acrylate, a dispersant, a rheology modifier, a photo initiator, and/or a UV stabilizer.

Exemplary pigments may include Ciba IRGALITE Blue GLO. Other suitable pigments include black pigments, white pigments, cyan pigments, magenta pigments, yellow pigments, and the like. Further, pigments may be organic or inorganic particles. Suitable inorganic pigments may include carbon black. However, other inorganic pigments may be suitable such as titanium oxide, cobalt blue (CoO-Al203), chrome yellow (PbCr04), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like.

Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226.

Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigments may be almost any commercially available carbon pigment that provides acceptable optical density and print characteristics. Carbon pigments suitable for use in systems and methods in accordance with embodiments may include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company.

Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle, for example.

Acrylates or propenoates are salts and esters of acrylic acid. Acrylate and methacrylate monomers are understood to contain reactive vinyl functional groups that facilitate formation of acrylate polymers. Exemplary acrylates may include acrylate monomers or polymers such as polyester acrylates Sartomer CN294E, Sartomer CD 501, and Sartomer CN 2256. In particular, exemplary acrylates inks possess polar functional groups, but are substantially non-polar along the monomeric or oligomeric backbone to the extent that they are non-miscible in water without surfactant.

Exemplary dispersants may include polymeric dispersants such as those from Lubrizol including SOLSPERSE 32000, SOLSPERSE 39000, SOLSPERSE 71000, SOLSPERSE J-100, SOLSPERSE J-200, SOLSPERSE X300 and from BASF such as EFKA 4300, EFKA 4330, EFKA 4340, EFKA 4400, EFKA PX 4701, EFKA 4585, EFKA 5207, EFKA 6230, EFKA 7701, EFKA 7731, and from Tego such as TEGO Dispers 656, TEGO Dispers 685, TEGO Dispers 710, and from King Industries such as K-SPERSE A-504.

Exemplary rheology modifiers may be modified or unmodified inorganic compounds including organoclays, attapulgite clays and bentonite clays, including tetraallkyl ammonium bentonites as well as treated and untreated synthetic silicas. Suitable organoclays include from Southern Clay Products CLAYTONE HA and CLAYTONE HY. Suitable examples of tetraallkyl ammonium bentonites include from Celeritas Chemicals CELCHEM 31743-09, CELCHEM 31744-09, and CELCHEM 31745-09. Other exemplary rheology modifiers include organic compounds such as EFKA RM1900 and EFKA RM1920, both modified hydrogenated castor oils from BASF, Photoinitiators may be liquid- or solid-based or combinations thereof. Suitable Type I photoiniators include those from classes of α-dialkoxy-aceto-pheonones, α-dialkoxy-alkyl-pheonones, α-amino-alkyl-pheonones, and acyl-phosphine oxides. Suitable Type II photoiniators include those from classes of benzophenones and thioxanthones, which require activation from suitable amine synergists. Exemplary photinitiators include ADDITOL LX, ADDITOL DX, ADDITOL BDK, ADDITOL CPK, ADDITOL DMMTA, ADDITOL TPO from Allnex, Esacure 1001 M from IRGACURE 127, IRGACURE 184, IRGACURE 379, IRGACURE 819 and IRGACURE 2959 from BASF. Exemplary amine synergists that are used with Type II photoinitiators include SPEEDCURE PDA, SPEEDCURE EDB from Lambson, Diethylaminoethyl Methacrylate, Ethyl-4-dimethylamino benzoate, 2-Ethylhexyl 4-dimethylamino benzoate from Esstech, Inc.

Exemplary UV stabilizers may include Sartomer USA CN3216 and BASF IRGASTAB UV22.

Inverse emulsion inks in accordance with embodiments may be formed by preparing a first solution comprising de-ionized water and surfactant. It has been found that when the surface tension of water in the first solution is below a surface tension of ink with minimal surfactant, an enhanced uniformity of distribution of emulsion size of the mixture results.

After forming the first solution, an inverse emulsion of digital acrylate ink may be prepared by adding the first solution drop-wise to an acrylate ink composition having components such as those disclosed above and that is configured for ink-based digital printing.

Methods of printing with inks in accordance with embodiments having enhanced wetting/release properties may include applying inverse emulsion ink onto an intermediate member or central imaging member having, for example, a fluorosilicone reinageable surface. The surface tension of the ink may be dynamically adjusted with the use of a solid surfactant or a small concentration of a liquid surfactant. Methods may include causing the water contained in the inverse emulsion ink composition to evaporate, enhancing a releasability of the ink from the surface of the imaging member. For example, the inverse emulsion ink may be formed to have a water content of about 1% to about 10%, and preferably, may be formed to have a water content of about 5%.

An aqueous cyan pigment inverse emulsion ink in accordance with compositions of embodiments was formed through experimentation. Inverse emulsion inks in accordance with embodiments may comprise a formulation, for example, as shown in Table 1. The formulation shown in Table 1 was found to be suitable for ink-based digital printing with good transferability and background performance, the ink being characterized by high tack.

TABLE 1

| Chemical | wt % Component In Ink |
|---|---|
| BASF HELIOGEN Blue D 7088 | 15.0 |
| Sartomer CN294E | 55.5 |
| Lubrizol Solsperse 39000 | 4.5 |
| Southern Clay CLAYTONE HY | 2.0 |
| BASF IRGASTAB UV10 | 0.2 |
| Sartomer SR 501 | 12.8 |
| Sartomer CN2256 | 10.0 |
| Total | 100.0 |

The formulation shown in Table 1 does not include photoinitiators, which facilitated ease of handling during testing of examples.

A number of inverse emulsion inks in accordance with embodiments were formulated and are shown as examples below including prophetic examples.

EXAMPLE 1

A first solution was prepared. Specifically, the first solution was formed by adding 1.0 ppm Silsurf A004-AC-UP (Siltech Corporation) to de-ionized water. The surface tension of the first solution at 21.5° C. was 23 dynes/cm. The corresponding surface tension of the same neat de-ionized water at 21.5° C. was 72.6 dynes/cm (literature value ~72.65 dynes/cm at 21.5° C.). All surface tension measurements were performed on the K-100 tensiometer equipped with Wilhelmy plate (available from Kruss). By lowering the surface tension of water to below the surface tension of the ink (with minimal surfactant), a more uniform and even distribution of an emulsion size of the mixture resulted.

An emulsion of ink suitable for ink-based digital printing was prepared. Specifically, an ink composition having a formulation in accordance with the formulation shown in Table 1 was provided. The first solution was added drop-wise to the provided digital ink to form an inversion emulsion having 4.2 wt % of the first solution as a component. The emulsion was carefully mixed to form a structure with initially an apparent high viscosity and elasticity, which dissipated quickly with further gentle mixing. The emulsion ink was tested and rheology data was obtained, as shown in Table 2.

TABLE 2

| Shear Viscosity Metric at 25° C. | Acrylate Ink | Inverse Emulsion Acrylate Ink |
|---|---|---|
| Maximum Viscosity within range of 0.0001 to 0.001 $s^{-1}$, mPa.s | 5.58E+05 | 1.87E+05 |
| Viscosity (5 1/s), mPa.s | 120725 | 47235 |
| Viscosity (50 1/s), mPa.s | 50955 | 23616 |
| Shear Thinning Index (50/5) | 0.42 | 0.50 |

The rheology data was obtained for the emulsified inks using an ARES G2 controlled strain rheometer having a Peltier temperature control system for rapid heating and cooling, and a geometry of 25 mm, 0.02 rad with a cone plate. The test procedure employed is characterized by a flow sweep at 25° and a shear rate of 1.0 e-4 to 500 1/sec.

The printing performance of test ink compositions made in accordance with the formulation of Table 1 was evaluated on an ink-based digital printing system. A transfer efficiency was found to be 95% when using a fluorosilicone plate (intended to simulate the reimageable surface of an imaging member) on which was formed an ink film having 0.084 mg/cm^2 of ink and a film thickness of about 0.7 microns. It was found that a transfer efficiency of inverse emulsified inks having reduced rheology was desirable and high, anilox roller delivery was facilitated and enhanced.

In particular, testing by simulated anilox hand delivery experiments was found to approximate fixture transfer and to produce comparative data. Rheology measurements demonstrated that when test ink compositions made in accordance with the formulation shown in Table 1 were emulsified with 5% water, ink rheology was reduced by about a half an order of magnitude, yet the ink compositions exhibited a high shear thinning index. As such, emulsion inks in accordance with embodiments having rheology and a shear thinning index in in the ranges observed flow efficiently from an anilox roller delivery system to a surface of an imaging member. In embodiments, an amount of water used to emulsify the ink composition is about 1% to about 10%, and preferably about 5%.

During testing, it was found that transfer efficiency of inverse emulsion ink in accordance with embodiments was less than 95% at time zero, as expected with a lower viscosity ink. Upon evaporation of water from the ink surface, however, a higher transfer efficiency of 95% and greater was observed. Accordingly, water may be added to inverse emulsion acrylate inks in accordance with embodiments to enhance transfer efficiency.

EXAMPLE 2

A first solution is prepared as per the first solution of Example 1 except that 0.5 ppm of Siltech surfactant is added.

An emulsion of ink suitable for ink-based digital printing is prepared. Specifically, an ink composition having a formulation in accordance with the formulation shown in Table 1 is provided except that the amount of pigment is reduced to 12% by weight and the amounts of CN294E and CN2256 are respectively increased by 1% and 2% by weight respectively. The first solution is added drop-wise to the provided digital ink to form an inversion emulsion having 1.5 wt % of the first solution as a component. The emulsion is carefully mixed to form a structure with, initially, an apparent high viscosity and elasticity, which dissipated quickly with further gentle mixing. The inverse emulsion ink of Example 2 is expected to have properties and performance characteristics similar to Example 1, particularly excellent transfer efficiency upon evaporation of the water.

EXAMPLE 3

A first solution is prepared as per the first solution of Example 1 except that 2.0 ppm of Siltech surfactant is added.

An emulsion of ink suitable for ink-based digital printing is prepared. Specifically, an ink composition having a formulation in accordance with the formulation shown in Table 1 is provided except that the amount of pigment is increased to 17.5% by weight and the amounts of CN294E and CN2256 are respectively decreased by 2% and 0.5% by weight respectively. The first solution is added drop-wise to the provided digital ink to form an inversion emulsion having 7 wt % of the first solution as a component. The emulsion is carefully mixed to form a structure with, initially, an apparent high viscosity and elasticity, which dissipated quickly with further gentle mixing. The inverse emulsion ink of Example 3 is expected to have properties and performance characteristics similar to Example 1, particularly excellent transfer efficiency upon evaporation of the water.

EXAMPLE 4

A first solution is prepared as per the first solution of Example 1 except that 1.2 ppm of Siltech surfactant is added.

An emulsion of ink suitable for ink-based digital printing is prepared. Specifically, an ink composition having a formulation in accordance with the formulation shown in Table 1 is provided except for the addition of 2 photoinitiators, Irgacure 184 and Irgacure 819, at concentrations of 4% and 5% by weight, respectively. The amount of pigment is kept at 15% and the relative amount of all the other components are adjusted also by 9% by weight keeping the ratio between the components the same. The first solution is added drop-wise to the provided digital ink to form an inversion emulsion having 3 wt % of the first solution as a component. The emulsion is carefully mixed to form a structure with initially an apparent high viscosity and elasticity, which dissipated quickly with further gentle mixing. The inverse emulsion ink of Example 4 is expected to have properties and performance characteristics similar to Example 1, particularly excellent transfer efficiency upon evaporation of the water. The curable inverse emulsion ink can optionally be pre-cured prior to transfer.

EXAMPLE 5

A first solution is prepared as per the first solution of Example 1.

An emulsion of ink suitable for ink-based digital printing is prepared. Specifically, an ink composition having a formulation in accordance with the formulation shown in Table 1 is provided except for the addition of 2 photoinitiators, Irgacure 184 and Irgacure 819, at concentrations of 2% and 5% by weight, respectively. The amount of pigment is reduced to 10% and the relative amount of all the other components are adjusted also by 2% by weight keeping the ratio between the components the same. The first solution is added drop-wise to the provided digital ink to form an inversion emulsion having 2 wt % of the first solution as a component. The emulsion is carefully mixed to form a structure with, initially, an apparent high viscosity and elasticity, which dissipated quickly with further gentle mixing. The inverse emulsion ink of Example 5 is expected to have properties and performance characteristics similar to Examples 1 and 4, particularly excellent transfer efficiency upon evaporation of the water. The curable inverse emulsion ink can optionally be pre-cured prior to transfer.

EXAMPLE 6

A first solution is prepared as per the first solution of Example 1.

An emulsion of ink suitable for ink-based digital printing is prepared. Specifically, an ink composition having a formulation in accordance with the formulation shown in Table 1 is provided except for the addition of 2 photoinitiators, Irgacure 184 and Irgacure 819, at concentrations of 3% and 6% by weight, respectively. The amount of pigment is kept at 15% and the relative amount of all the other components are adjusted also by 9% by weight keeping the ratio between the components the same. The first solution is added drop-wise to the provided digital ink to form an inversion emulsion having 5 wt % of the first solution as a component. The emulsion is carefully mixed to form a structure with initially an apparent high viscosity and elasticity, which dissipated quickly with further gentle mixing. The inverse emulsion ink of Example 6 is expected to have properties and performance characteristics similar to Examples 1 and 4, particularly excellent transfer efficiency upon evaporation of the water. The curable inverse emulsion ink can optionally be pre-cured prior to transfer.

Inverse emulsion acrylate ink compositions in accordance with embodiments are suitable for ink-based digital printing. Inks in accordance with the embodiments are compatible with dampening fluids and imaging member or reimageable surface/plate materials using from ink-based digital printing. For example, compositions in accordance with the disclosed embodiments may be immiscible in dampening fluids, such as D4, and provide low background in non-imaging areas. Because water is used to form inverse emulsion acrylate inks for use in ink-based digital printing applications, ink cost may be lowered for related print operations.

Inks in accordance with embodiments permit robust printing and longer subsystem life expectancy due to high compatibility between water, dampening fluid and ink-based digital imaging member or reimageable surface/plate materials. Ink compositions in accordance with disclosed embodiments are expected to be as easily delivered from a production anilox roller ink delivery subsystem, as they were in the experimental simulated anilox roller ink transfer system and as compared with higher viscosity conventional offset inks. Further, ink compositions in accordance with the disclosed embodiments exhibit high stability of water in ink compared with water-diluted formulations, due to the emulsion formation, which provides a higher barrier to evaporation during normal use. Finally, ink compositions in accordance with embodiments exhibit transfer efficiency of 95% or greater from the reimageable surface of the imaging member upon evaporation of water. Water removal by evaporation may be brought about by controlled application of heat or by another method during the print process.

It will be appreciated that the above-disclosed and other features and functions, or alternatives thereof, may be desirably combined into many other different compositions or formulations, systems or applications. Also, various presently unforeseen or unanticipated alternatives, modifications, variations or improvements therein may be subsequently made by those of skill in the printing and ink arts.

What is claimed is:

1. An ink composition useful for variable data digital lithographic printing, comprising:

an acrylate ink base formulation comprising:

a) a color pigment component, b) at least one of an acrylate monomer, oligomer or polymer, or a mixture thereof, forming a continuous acrylate phase, and c) a free radical photoinitiator component comprising at least one of a type I photoinitiator and a type II photoinitiator; and an aqueous solution consisting of water and a single surfactant in an amount of from about 1.0 ppm to about 2.0 ppm, wherein the aqueous solution is dispersed in the continuous acrylate phase of the acrylate ink base to provide an inverse emulsion ink composition having a viscosity in the range of from about 1E+05 centipoise to about 1E+06 centipoise at a temperature of from about 20 degrees Celsius to about 50 degrees Celsius, wherein the surfactant lowers a surface tension of the water to below a surface tension of the acrylate ink base formulation, and wherein the at least one of the acrylate monomer, oligomer or polymer, or a mixture thereof comprises a high-viscosity, di-functional acrylated polyester oligomer.

2. The ink composition of claim 1, wherein the acrylate ink base formulation further comprises:

a rheology modifying agent; and a UV stabilizing agent.

3. The ink composition of claim 1, wherein the inverse emulsion comprises 5% or less by weight of the aqueous solution.

4. The ink composition of claim 1, wherein the ink composition comprises a total water content in an amount ranging from about 1% to about 10%.

5. The ink composition of claim 1, wherein a shear thinning index (50/5) of the ink composition is from about 0.35 to about 0.65.

6. A method for preparing an ink composition for use in digital printing, comprising:

a) preparing an acrylate ink base formulation comprising mixing a color pigment component and a free radical photoinitiator component with at least one of an acrylate monomer, acrylate oligomer, acrylate polymer or a mixture thereof, wherein the free radical photoinitiator component comprises at least one of a type I photoinitiator and a type II photoinitiator, wherein at least one of an acrylate monomer, acrylate oligomer, acrylate polymer or a mixture thereof forms a continuous acrylate phase; and b) preparing an aqueous solution by mixing water and a single surfactant and c) dispersing the aqueous solution in the continuous acrylate phase of the acrylate ink base to form an inverse emulsion ink composition having a viscosity in the range of from about 1E+05 centipoise to about 1E+06 centipoise at a temperature of from about 20 degrees Celsius to 50 degrees Celsius, wherein the inverse emulsion comprises a total water content in an amount ranging from about 1% to about 10% and wherein the at least one of the acrylate monomer, oligomer or polymer, or a mixture thereof comprises a high-viscosity, di-functional acrylated polyester oligomer.

7. The method of claim 6, wherein the at least one acrylate monomer, acrylate oligomer, acrylate polymer or the mixture thereof constitutes a continuous phase and the aqueous solution is dispersed as an emulsified liquid within the continuous phase.

8. The method of claim 6, wherein preparing the acrylate ink base formulation further comprises introducing at least one of a rheology modifying agent and a stabilizing agent into the acrylate ink base formulation.

9. The method of claim 6, wherein the surfactant lowers the surface tension of the water to below a surface tension of the acrylate ink base formulation.

10. The method of claim 6, wherein a shear thinning index (50/5) of the ink composition is from about 0.35 to about 0.65 after evaporating water from the ink composition.

11. An ink composition useful for variable data digital lithographic printing, comprising:

an acrylate ink base formulation comprising:

a) a color pigment component, b) at least one of an acrylate monomer, oligomer or polymer, or a mixture thereof, forming a continuous acrylate phase, and c) a free radical photoinitiator component comprising at least one of a type I photoinitiator and a type II photoinitiator; and an aqueous solution comprising water and from 0.5 ppm to 2 ppm of a single surfactant, wherein said aqueous solution is dispersed in the continuous acrylate phase of the acrylate ink base to provide an inverse emulsion ink composition having a viscosity in the range of from about 1E+05 centipoise to about 1E+06 centipoise at a temperature of from 20 degrees Celsius to 50 degrees Celsius, wherein the inverse emulsion comprises 5% or less by weight of the aqueous solution, and wherein the at least one of the acrylate monomer, oligomer or polymer, or a mixture thereof comprises a high-viscosity, di-functional acrylated polyester oligomer.

12. The ink composition of claim 11, wherein the surfactant lowers a surface tension of the water to below a surface tension of the acrylate ink base formulation.

13. The ink composition of claim 11, wherein the ink composition comprises a total water content in an amount ranging from about 1% to about 10%.

14. The ink composition of claim 1, wherein the acrylate ink base formulation comprises more than one of the acrylate monomer, oligomer and polymer.

15. The ink composition of claim 1, wherein the high-viscosity di-functional acrylated polyester oligomer has a viscosity of at least 11,000 cps at 60° C.

16. The ink composition of claim 1 wherein the high-viscosity di-functional acrylated polyester oligomer has a viscosity of at least 11,000 cps at 60° C.

* * * * *